United States Patent [19]
Lewiner et al.

[11] Patent Number: 5,565,717
[45] Date of Patent: Oct. 15, 1996

[54] DEVICES FOR MANUFACTURING ELECTRETS, AND ELECTRETS OBTAINED THEREBY

[76] Inventors: Jacques Lewiner, 7, avenue de Suresnes, 92210 Saint-Cloud; Didier Perino, 84, rue Voltaire, 92500 Rueil-Malmaison, both of France

[21] Appl. No.: 248,051

[22] Filed: May 24, 1994

[30] Foreign Application Priority Data

May 26, 1993 [FR] France ................................ 93 06313

[51] Int. Cl.$^6$ ................................................. G11C 13/02
[52] U.S. Cl. ...................... 307/400; 29/886; 55/DIG. 39; 264/436
[58] Field of Search ...................... 307/400; 55/DIG. 39; 428/212; 29/631.1, 592.1, 886; 361/207, 227–229, 223–225; 264/227, 122, 28, 235, 345, 346, 24, 405, 435, 436

[56] References Cited

U.S. PATENT DOCUMENTS

| | | | |
|---|---|---|---|
| 4,355,235 | 10/1982 | Lewiner et al. | 250/376 |
| 4,441,038 | 4/1984 | Tanaka et al. | 307/400 |
| 4,458,161 | 7/1984 | Wada et al. | 307/400 |
| 4,527,218 | 7/1985 | Von Seggern | 361/233 |
| 5,284,692 | 2/1994 | Bell | 428/69 |

FOREIGN PATENT DOCUMENTS 0119706  9/1984  European Pat. Off. .

OTHER PUBLICATIONS

Patent Abstracts of Japan, vol. 6, No. 77 (E–106) May 14, 1982 & JP-A-57 014 296 (Toshiba Corp) Jan. 25, 1982.
IEEE Transactions on Industry Applications, vol. IA, No. 20, Nov. 1984, New York, USA pp. 1623–1626, Improved Surface Voltage Uniformity on Electrets . . .

*Primary Examiner*—Jonathan Wysocki
*Assistant Examiner*—Jonathan Kaplan
*Attorney, Agent, or Firm*—Larson and Taylor

[57] ABSTRACT

To manufacture a thin sheet electret of small size having charge distributed in very uniform manner, even at its edges, use is made of a device comprising a grounded electrode (2) for supporting a dielectric (1) to be charged, means for generating ions (3) in the vicinity of the dielectric, a grid (4) extending parallel to the surface to be charged of the dielectric, at a small distance from said face, and raised to an electric potential different from ground potential and a conductive frame (7) that is insulated from the electrode and that is electrically connected to the grid, said frame surrounding the dielectric and forming a single block with the electrode.

9 Claims, 2 Drawing Sheets

DEVICES FOR MANUFACTURING ELECTRETS, AND ELECTRETS OBTAINED THEREBY

BACKGROUND OF THE INVENTION

1. Field of the Invention

The invention relates to electrets, i.e. to dielectrics that are permanently electrically polarized because they carry permanent electrical charge.

More particularly, it relates to those electrets that are in the form of sheets or thin layers and usable, in particular, for building electromechanical transducers (microphones, accelerometers, pressure sensors, etc.) or electrostatic relays.

The invention relates in particular to devices for manufacturing electrets of the kind in question.

2. Description of the Prior Art

With known methods of manufacturing such electrets, it is very difficult to obtain uniform distribution of the electric charge carried: charge density is much lower in the vicinity of the edges of the electret than in the center, and may even be zero.

Such lack of uniformity gives rise to various drawbacks, in particular with respect to the sensitivity and/or the stability of transducers or relays built on the basis of the corresponding electrets.

To remedy that drawback, i.e. to obtain uniform distribution of electric charge over the entire charged face of the electret, including right up to its edges, proposals have already been made to place a diaphragm a short distance from said face while it is being charged, the diaphragm carrying electric charge of the same sign as the charge being implanted, and the opening in the diaphragm corresponding to the area to be charged.

That method requires relatively exact positioning in all directions between the diaphragm and the face to be charged, and in the implementation of said method as described in an article by Heinz Von Seggern, published on pages 1623 to 1626 of IEEE Transactions on Industry Applications, Vol. 1A-20 Nov. 1984, New York, the area to be charged was single and separated from the diaphragm by a distance of about 1 millimeter and had a surface area of much more than 10 cm$^2$.

SUMMARY OF THE INVENTION

A particular aim of the invention is to improve the charging methods and devices in question, in particular by making them easily applicable to manufacturing thin sheet electrets of relatively small dimensions, the greatest of said dimensions being less than 1 cm and preferably less than 6 mm: this applies to numerous $SiO_2$ electrets which are often in the form of small rectangular plates having dimensions of about 2 mm to 3 mm.

To this end, devices for manufacturing electrets of the kind in question still comprise an electrode for supporting the dielectric that is to be charged in order to become an electret, means for generating electric charge and for entraining it towards the dielectric, and a frame disposed close to the periphery of the dielectric, which frame is constituted and installed in such a manner as to carry electric charge of the same sign as the charge being implanted in the dielectric, at least while the dielectric is being charged, and they are characterized in that the said frame forms a single block with the electrode.

Thus, there is no longer any risk of the frame being wrongly positioned relative to the electrode while the dielectric is being charged, the resulting assembly is robust overall and it lends itself easily to simultaneous manufacture of a plurality of small-sized electrets having remarkable uniformity in distribution of the implanted electric charge, right up to the margins of the charged faces.

In preferred embodiments, use is also made of one or more of the following dispositions:

- the frame is electrically conductive and is insulated from the electrode by a solid electrically-insulating layer;
- in a device according to the preceding paragraph, the frame forms an integral portion of a conductive plate itself supporting the electrode with an insulating layer being interposed therebetween;
- in a device according to the paragraph before the preceding paragraph, the frame is pierced by an opening in which it receives the electret and is placed on the electrode with an interposed insulating layer;
- the frame is constituted by a dielectric suitable for receiving permanent electric charge, as is the dielectric surrounded by said frame; and
- the frame itself forms a portion of a grid or perforated layer or sheet designed for simultaneous manufacture of a plurality of electrets, and defines one of the meshes thereof.

The invention also provides electrets obtained by means of the above devices, which electrets have highly uniform surface charge, even at their margins, said electrets advantageously implementing at least one of the following characteristics:

- each of the two long dimensions of the charged thin layer or sheet is shorter than 6 mm; and
- the charged thin layer or sheet is made of $SiO_2$.

In addition to the above dispositions, the invention comprises certain other dispositions which are preferably used simultaneously therewith and which are described in greater detail below.

BRIEF DESCRIPTION OF THE DRAWINGS

Three embodiments of the invention are described by way of non-limiting illustration, and with reference to the accompanying drawing.

Figure 1:
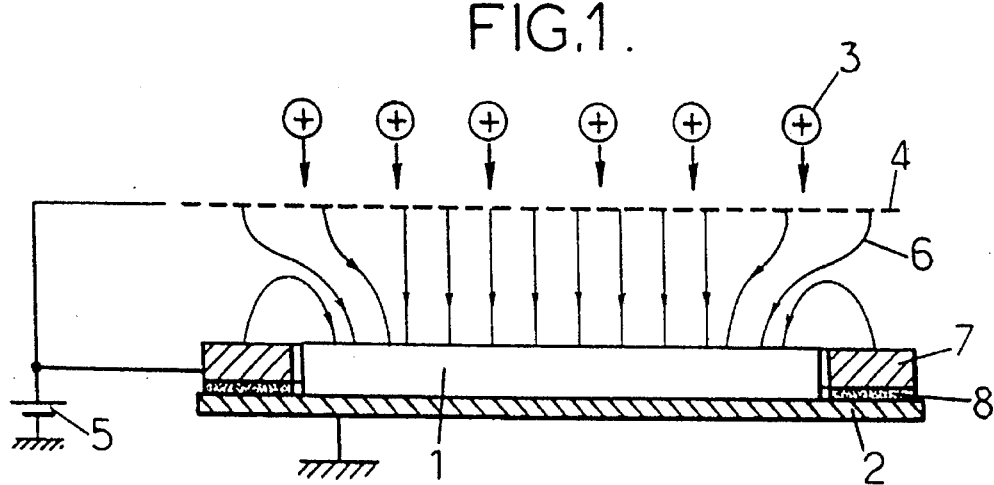
FIGS. 1, 2 and 3 in the drawing are respective diagrams of three devices used for charging electrets and each of them is implemented in accordance with the present invention.

In each of these devices, there can be seen a dielectric 1 to be charged which is present in the form of a-thin layer or sheet, advantageously made of $SiO_2$, and an electrode plate 2 that is grounded and against which the dielectric is placed, which plate may be made of silicon.

Ions 3 to be implanted in the dielectric 1 may be created in the environment of said dielectric in any appropriate way, e.g. by means of an electron gun, or by means of a driving electric field.

In each of the embodiments described below, the ions 3 are created by the corona effect, and the ions 3 are accelerated towards the dielectric through a grid 4 which is raised by means of a voltage source 5 to a potential that is close to the surface potential which it is desired to obtain for the electret. The electric field lines followed by the ions 3 are referenced 6.

In the first embodiment shown diagrammatically in FIG. 1, there can also be seen a conductive frame 7 placed on the electrode 2 with an interposed insulating layer 8 around the dielectric 1 and almost in contact therewith.

The frame 7 is electrically connected to the grid 4 so as to be raised to the same potential as the grid.

The presence of the frame 7 raised to the indicated potential all around the edges of the dielectric 1 prevents any deflection or leakage of ions 3 towards the overhanging periphery of the electrode 2.

On the contrary, the frame 7 plays the same role as the grid 4 with respect to driving ions 3 towards the dielectric 1.

In the end, the distribution of permanent electric charge implanted in the final electret is uniform over the entire charged area of said electret, including at its margins.

The frame 7 may be fixed permanently to the electrode 2, with electrical connection between the frame and the electrode being established after the electret has been charged.

If, as assumed above, the electret 1 is made of $SiO_2$, and the substrate electrode 1 is made of silicon, then the frame 7 may be constituted by the frame that is commonly used for ensuring final adhesion between said substrate 1 and another sheet or plate of silicon (not shown) covering the entire assembly and appropriately micromachined, said frame 7 then advantageously being made of gold or of a gold alloy.

In a variant, provision may be made for the frame 7 to be placed on the electrode 1 in temporary manner only so that it is removable after charging.

In the embodiment described above, the final value $U_1$ obtained for the surface potential of the electret is, in theory, equal to the potential to which the grid 4 was raised during charging.

In practice, this final value may be slightly greater than the potential of the grid since accelerated ions may have sufficient kinetic energy to go through the grid even when the electric field that exists between the grid and the surface of the electret has become zero, so that they continue to be deposited on the electret even after equal potentials have been established.

Under such circumstances, while charging is taking place, it is appropriate to raise the frame 7 to a final value of potential $U_2$ that is slightly greater than $U_1$.

By way of example, if the electrode 1 is put to a potential $U_0$ of zero volts, then the tensions $U_1$ and $U_2$ may be made respectively equal to 200 volts and 220 volts.

Figure 2:
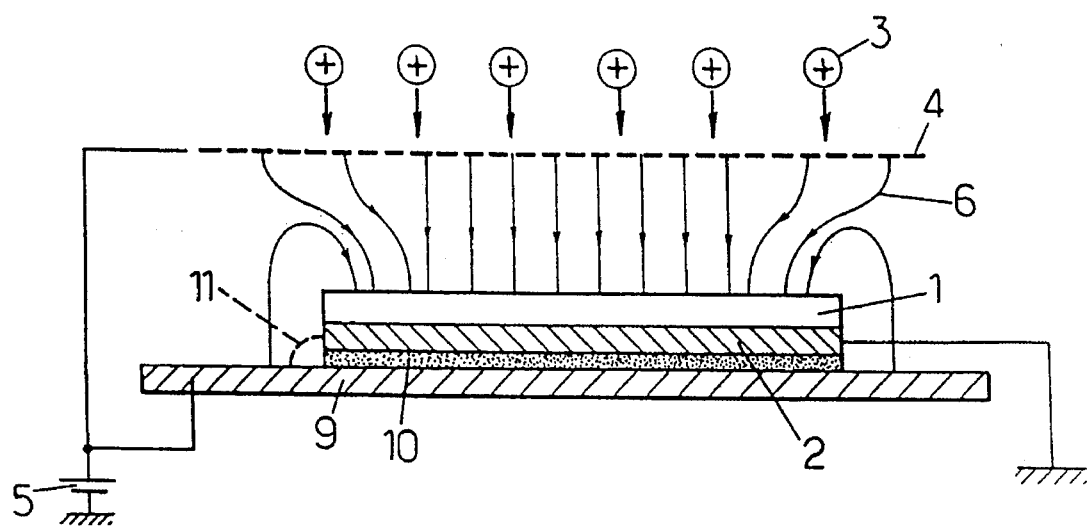

In the second embodiment shown diagrammatically in FIG. 2, the dimensions of the electrode 1 on which the dielectric to be charged is placed are identical to the dimensions of the dielectric, and the assembly is itself deposited on a conductive substrate 9 with an intervening insulating layer 10.

The substrate 9 is raised to the potential $U_1$ as defined above, and it is dimensioned so as to project outwards all round the assembly 1, 2.

In this case, it is the edges of the substrate that play the role of the above-described frame 7: these edges are not accurately disposed "around" the dielectric 1, i.e. on the same level as the dielectric, but the correcting electrical role that they play relative to peripheral ions 3, i.e. urging them towards the electric 1, is entirely analogous to the above.

Here again, means may advantageously be provided as represented by dashed lines 11 for the purpose of electrically connecting the substrate 9 to the electrode 2 after the electret 1 has been charged.

Figure 3:
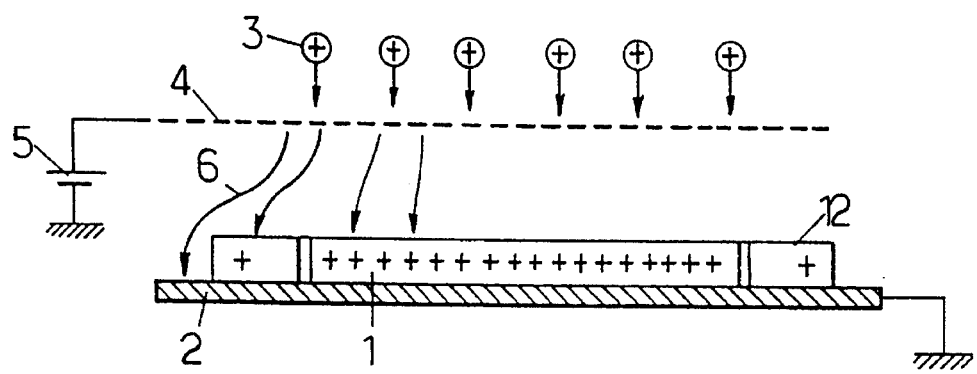

In the third embodiment shown diagrammatically in FIG. 3, the frame referenced 12 is made of a dielectric material identical or analogous to that constituting the dielectric 1, i.e. capable like that dielectric of trapping electrical charge sprayed onto its surface.

Everything then takes place as though the frame 12 itself constitutes the periphery of a larger dielectric with charging taking place conventionally.

The main difference between the two processes lies in the fact that in the present case, said "periphery" of the enlarged dielectric which ends up less charged than the remainder of said dielectric, i.e. the remainder constituting the central portion of the enlarged dielectric and designed to become the final electret, can be separated from said remainder at the end of charging since it is constituted by the frame 12 itself which is independent of the electret being formed 1.

In this case, as in the cases of FIGS. 1 and 2, it can be observed that during charging of the dielectric 1 the frame 12 carries a certain amount of electric charge having the same sign as the charge to be implanted in the dielectric, which charge in the frame is suitable for electrically opposing "leakage" towards the electrode 2 of the charge that is to be implanted in the periphery of the dielectric.

It may also be observed that the presence of the frame 12 itself distances the electrode 2 from the edges of the dielectric 1, thereby correspondingly reducing the above-mentioned tendency to leakage.

Dispositions are advantageously taken to enable the frame 12 to be effectively separated after the electret has been charged, it being possible to interpose an anti-adhesive layer (not shown) between said frame and the electrode 2.

The thickness of the frame 7 or 12 may be equal to the thickness of the electret 1. Alternatively it may be less than or greater than the thickness of the electret 1.

The width of the gap between the electret 1 and the frame 7 or 12 surrounding the electret may be zero; it may be non-zero, in which case it is preferably less than the distance between the grid 4 and the facing face of the electret 1.

As a result, and regardless of the particular embodiment used, methods and devices are finally obtained for charging electrets that enable remarkably uniform distribution of the implanted electric charge to be obtained for the electrets in a manner that is very simple, said uniformity extending right up to the edges of the electrets, thereby achieving excellent qualities of sensitivity and/or stability, and this applies even if the electrets are small in size, having a maximum dimension of less than 6 mm.

Naturally, and as can already be seen from the above, the invention is not limited in any way to those applications and embodiments that have been described more particularly; on the contrary, it extends to any variants, and in particular:

those in which the electrode that carries the dielectric to be charged is raised to a fixed potential $U_0$ other than the zero potential of ground; and those in which the frame itself forms a portion of a grid or of a perforated layer or sheet designed for manufacturing a plurality of electrets simultaneously, the frame outlining one of the meshes therein.

Figure 4:
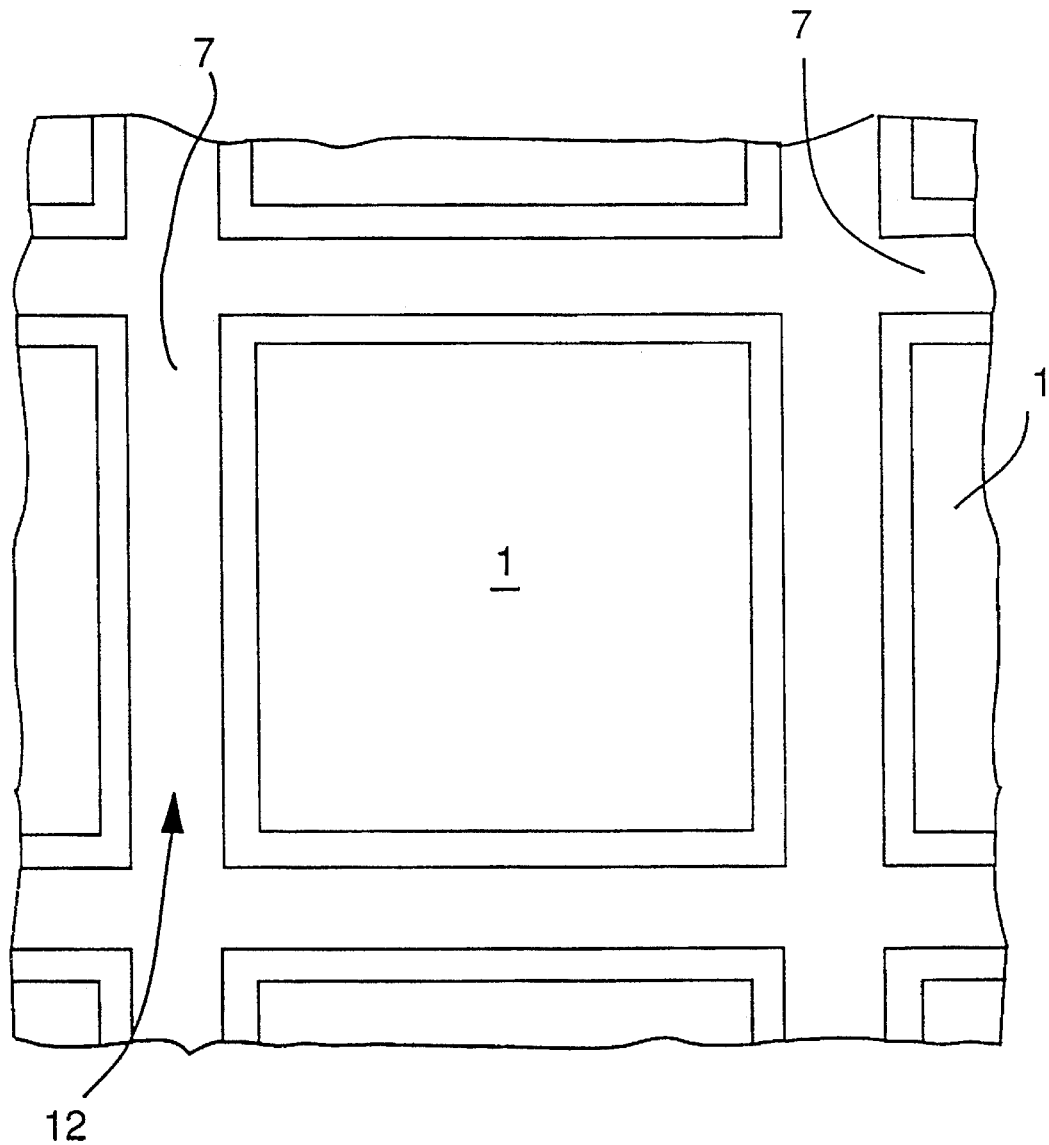
FIG. 4 is a detail of an embodiment employing a grid or perforated sheet in the manufacture of a plurality of electrets simultaneously.

In this latter regard, reference is made to FIG. 4 which shows such a grid or perforated layer or sheet, denoted 12. As illustrated, the individual frames 7 which are formed by or make up the grid 12 each outline or surround one opening or mesh of the grid 12 in which a corresponding dielectric 1 is received.

We claim:

1. A device for manufacturing an electret comprising a dielectric comprising a permanently electrically charged thin layer or sheet, the device comprising an electrode for supporting the dielectric that is to be implanted with charge in order to become an electret, means for generating electric charge and for entraining the electric charge towards the dielectric, and a frame, disposed close to the periphery of the dielectric so as to substantially surround said periphery, for carrying electric charge of the same sign as the charge being implanted in the dielectric, at least while the dielectric is being charged, said frame and said electrode both being part of a single unit.

2. A device for manufacturing an electret according to claim 1, wherein the frame (7) is electrically conductive and is insulated from the electrode by a solid electrically-insulating layer.

3. A device for manufacturing an electret according to claim 2, wherein the frame forms an integral portion of a conductive plate for supporting the electrode with an insulating layer (10) being interposed therebetween.

4. A device for manufacturing an electret according to claim 2, wherein the frame includes an opening in which the dielectric is received, said frame being disposed on the electrode with an insulating layer interposed therebetween.

5. A device for manufacturing an electret according to claim 1, wherein said frame surrounds said dielectric, wherein said dielectric receives permanent electric charge, and wherein the frame comprises a dielectric for receiving permanent electric charge.

6. A device for manufacturing an electret according to claim 4, wherein the frame comprises a portion of a grid or perforated layer or sheet having openings therein and designed for simultaneous manufacture of a plurality of electrets, the frame defining one of said openings.

7. A device for manufacturing an electret according to claim 5, wherein the frame forms a portion of a grid or perforated layer or sheet having openings therein designed for simultaneous manufacture of a plurality of electrets, the frame defining one of said openings.

8. A thin sheet electret manufactured using the device according to claim 1, having highly uniform surface charge even at its margins, the electret having two major dimensions each shorter than 6 mm.

9. An electret according to claim 8, wherein the dielectric is made of $SiO_2$.

* * * * *